United States Patent Office 3,513,175
Patented May 19, 1970

3,513,175
2-OXO-TETRAHYDROFURANS
Arthur John Floyd, Bracknell, England, assignor to Imperial Chemical Industries Limited, London, England, a corporation of Great Britain
No Drawing. Filed Aug. 12, 1963, Ser. No. 301,604
Claims priority, application Great Britain, Aug. 17, 1962, 31,698/62
Int. Cl. C07f 9/32
U.S. Cl. 260—343.6          3 Claims This invention relates to organo-phosphorus compounds having pesticidal activity, to a process of making them and to pesticidal compositions containing them.

The invention includes as one aspect lactone derivatives of a phosphorus thiolic acid, having a sulphur atom connecting the lactone ring at a position other than its β-position to the phosphorus atom of a phosphorus thiolic acid residue. The phosphorus thiolic acid can be, for example, a phosphorothiolic acid, for instance O:O-diethyl phosphorothiolic acid; a phosphorodithioic acid, for instance O:O-dimethyl phosphorodithioic acid; an alkylphosphonothiolic acid, for instance O-ethyl methylphosphonothiolic acid; an alkyl phosphonodithioic acid, for instance O-methyl methyl-phosphonodithioic acid; or a dialkyl phosphinothiolic acid, for instance diethylphosphinodithioic acid.

Compounds included in the invention, for example, are those of the formula:

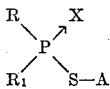

where R is an alkyl, alkoxy or alkylmercapto radical having 1–6 carbon atoms; $R_1$ is an alkyl, alkoxy, alkylmercapto, alkylamino, or dialkylamino radical having 1–6 carbon atoms; X is an atom of oxygen or sulphur; and A is a gamma or delta lactone residue attached at its α-carbon atom to the sulphur atom depicted. Where the lactone ring residue is one derived from a gamma lactone it can be, for example, a gamma-butyrolactone (2-oxotetrahydrofuran) residue. Thus, for example, the compounds can be ones of the following formula:

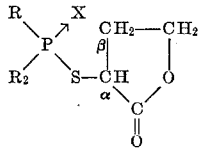

where R, $R_1$ and X have the meanings given above.

In the compounds of the invention R and $R_1$, which can be the same or different, can be, for example, radicals having 1–4 (particularly one or two) carbon atoms. For example, R and $R_1$ can both be methyl, ethyl, methoxy or ethoxy radicals. Alternatively, R can be a methyl radical and $R_1$ can be a methoxy, ethoxy, propoxy, or butoxy radical.

The compounds of the invention can be prepared, for example, by a process in which a compound of the formula:

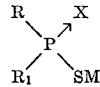

where R, $R_1$ and X have the meanings given to them above and M is an atom of sodium or like alkali metal, is reacted with an appropriate lactone having a replaceable atom of bromine or like halogen substituent on its alpha carbon atom. For example, where the compound to be prepared is one having a gamma lactone ring, the lactone reactant can be one having the formula:

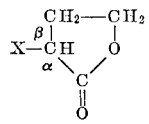

where X is a bromine or like halogen substituent. Alternatively, the compounds can be prepared by a modification of the process described above, in which instead of the alkali metal salt there is used the corresponding free acid in the presence of an acceptor for the hydrogen halide evolved. A further possible process is the interaction of a thiol derivative of the lactone with a suitable halogeno-phosphorus compound.

The invention also includes pesticidal compositions comprising as active ingredient an organo-phosphorus compound of this invention in admixture with a carrier or a diluent or with a suitable second pesticidal substance. The pesticidal compositions can, for example, be liquid compositions in which the active ingredient is dissolved or dispersed in water or a suitably non-phytotoxic organic liquid. The compounds of the invention are, in general, only slightly soluble in water, but they are readily soluble in certain organic solvents. This fact can be utilised in preparing aqueous compositions of compounds of the invention, by dissolving the compound in a small quantity of a suitable organic solvent, and dispersing the resulting solution in water, for example, with the aid of a wetting or dispersing agent. Pesticidal compositions of this invention can alternatively be in the form of powders in which the active ingredient is in admixture with a powder diluent.

The pesticidal compositions, whether liquid or powder, can if desired contain substances of types known as being useful in pesticidal compositions, for example, wetting or dispersing agents, corrosion inhibitors, binders, stickers and stabilising agents.

The invention also includes a method of combating insect pests, in which the pest or surfaces, plants or living spaces liable to be infested with it, or sites suitable for its breeding, are treated with an organo-phosphorus compound or a pesticidal composition of this invention.

The invention is illustrated by the following examples.

EXAMPLE 1

This example describes the preparation of 3-diethoxyphosphinothioylthio-2-oxo-tetrahydrofuran.

O:O-diethyl phosphorodithioic acid (3.16 g.) was added as drops to a solution of sodium (0.37 g.) in absolute ethanol (30 ml.). To the resultant mixture was then added as drops 3-bromo-2-oxo-tetrahydrofuran (2.75 g.) and this mixture was then heated under reflux for 1¾ hours. At the end of that time the liquid reaction product was cooled and was decanted from the small amount of solid which had precipitated. The ethanol was removed from the liquid product by distillation in vacuo and the residue was extracted with ether (150 ml.). The ethereal solution was washed with three successive 10-ml. portions of water, dried over anhydrous magnesium sulphate and the ether was removed by distillation in vacuo. The residual oil was distilled to a pot temperature of 105° C. at 0.005 mm., when there remained crude 3-diethoxyphosphinothioylthio-2-oxo-tetrahydrofuran as a yellow oil $n_D^{14}$ 1.5302.

EXAMPLES 2–5

Several other lactone derivatives of phosphorus acids (included below as Examples 2–5) have been prepared by the general process of Example 1, but using the appropriate phosphorus thiolic acid in place of the O:O- diethyl phosphorodithioic acid used in Example 1. These phosphorus acids are all believed to have a structure corresponding to the formula:

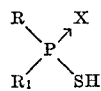

and the substances obtained as products of the examples are believed to have the corresponding formula:

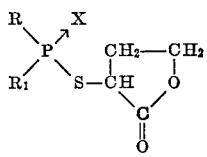

where R is a lower alkyl or alkoxy radical, $R_1$ is a lower alkoxy radical and X is an atom of sulphur or oxygen.

In the table below the phosphorus acids used in the processes of Examples 2–5 are identified simply by reference to the nature of the groups R, $R_1$ and X.

| Example No. | R | $R_1$ | X | Physical constants |
|---|---|---|---|---|
| 2 | $CH_3O$ | $CH_3O$ | S | $n_D^{20}$ 1.5432 |
| 3 | $C_2H_5O$ | $C_2H_5O$ | O | $n_D^{20}$ 1.4860 |
| 4 | $CH_3$ | $C_2H_5O$ | S | $n_D^{20}$ 1.5577 |
| 5 | $CH_3$ | $C_2H_5O$ | O | B.P. 80–95° C./0.005 mm. $n_D^{20}$ 1.4852 |
| 6 | $CH_3$ | $CH_3O$ | S | $n_D^{20}$ 1.5456 |

EXAMPLE 6

Pesticidal compositions of the lactone derivatives described in Examples 1 to 5 were made by dissolving each of the derivatives in a mixture of 2 parts by volume of acetone and 1 part by volume of diacetone alcohol to form solutions containing 4% by weight of the derivatives. These solutions were then diluted to 1000 parts per million of active ingredient with an aqueous solution containing 0.01% by weight of a wetting agent which is sold under the trademark "Lissapol" NX to form aqueous dispersions of the active ingredients.

The activity of these derivatives was then determined against black aphids (*Aphis fabae*) and green aphids (*Macrosiphum pisi*), red spider mites, mustard beetles and houseflies by supporting the pests on suitable host plants or contained in suitable media, spraying them with the dispersions and then noting the time taken for the pests to die. In this way it was found that the derivatives described in Examples 1, 3, 4 and 6 were especially effective in that they were able to kill at least 90% of the pests in from 1 to 3 days.

What is claimed is:
1. A compound of the formula:

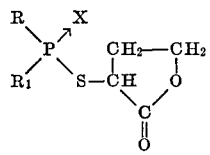

wherein X is sulphur, R is lower alkyl and $R_1$ is lower alkoxy.

2. A compound according to claim 1 wherein R is methyl and $R_1$ is ethoxy.

3. A compound according to claim 1 wherein R is methyl and $R_1$ is methoxy.

References Cited

UNITED STATES PATENTS

| | | | |
|---|---|---|---|
| 2,974,084 | 3/1961 | Mayhew et al. | 167—33 |
| 3,086,907 | 4/1963 | Hessel | 167—33 |
| 2,995,576 | 8/1961 | Kagau et al. | 260—343.6 |
| 2,997,482 | 8/1961 | Craven | 260—343.5 |
| 3,413,318 | 11/1968 | Baker | 260—343.6 |
| 3,432,599 | 3/1969 | Hackmann | 260—343.2 |

OTHER REFERENCES

Derwent Belgian Patent Rept. No. 95A (Belg. 616,760), sec. 5, Gen. Org., p. 2 (Apr. 20, 1962).

JAMES A. PATTEN, Primary Examiner

U.S. Cl. X.R.

260—343.5; 424—203